United States Patent [19]

Blatt et al.

[11] 4,444,540

[45] Apr. 24, 1984

[54] AUTOMATION LIFT UNIT

[76] Inventors: Leland F. Blatt; John A. Blatt, both of 31915 Groesbeck Hwy., Fraser, Mich. 48026

[21] Appl. No.: 287,765

[22] Filed: Jul. 29, 1981

[51] Int. Cl.³ .................. F16H 1/04; B65G 57/20
[52] U.S. Cl. ................... 414/589; 74/89.15; 414/753; 414/732
[58] Field of Search .............. 414/222–225, 414/751–753, 744, 589, 596, 732; 74/89.15, 41, 583; 248/162.1, 419, 325; 92/140

[56] References Cited

U.S. PATENT DOCUMENTS

| 3,259,352 | 7/1966 | Olsen | 248/325 |
| 3,394,650 | 7/1968 | Cagle | 100/207 X |
| 3,834,555 | 9/1974 | Bennington et al. | 414/744 B |
| 3,866,485 | 2/1975 | Blatt | 74/422 |
| 3,884,363 | 5/1975 | Ajlouny | 414/751 X |
| 4,289,441 | 9/1981 | Inaba et al. | 414/589 |

FOREIGN PATENT DOCUMENTS 2718646 11/1978 Fed. Rep. of Germany ...... 414/751

Primary Examiner—Joseph E. Valenza
Assistant Examiner—Terrance L. Siemens
Attorney, Agent, or Firm—Cullen, Sloman, Cantor, Grauer, Scott & Rutherford

[57] ABSTRACT

A lift unit is mountable upon a press or machine tool and comprises a housing having a back plate mounting a pair of upright guide rods and journal an upright feed screw. A carriage has a carriage plate guidably mounted upon the rods and threadably engaging the feed screw. A programmable DC motor upon the housing has a drive shaft coupled to the feed screw. An angularly adjustable support cradle depends from the carriage below the housing and is adapted to mount a workpiece gripper tool adapted for programmed transverse controlled reciprocal movements relative to the press. An electronic encoder upon the motor controls the direction and number of rotations of its drive shaft for effecting a programmed repetitive cycle of predetermined feed movements of the carriage.

10 Claims, 5 Drawing Figures

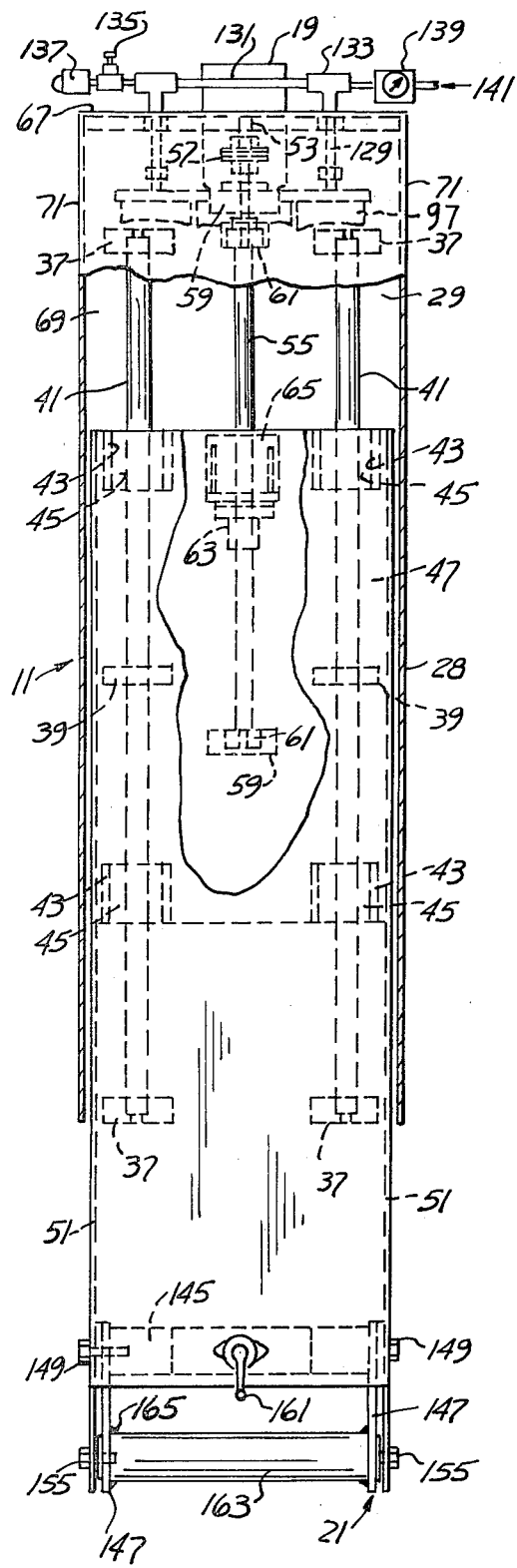
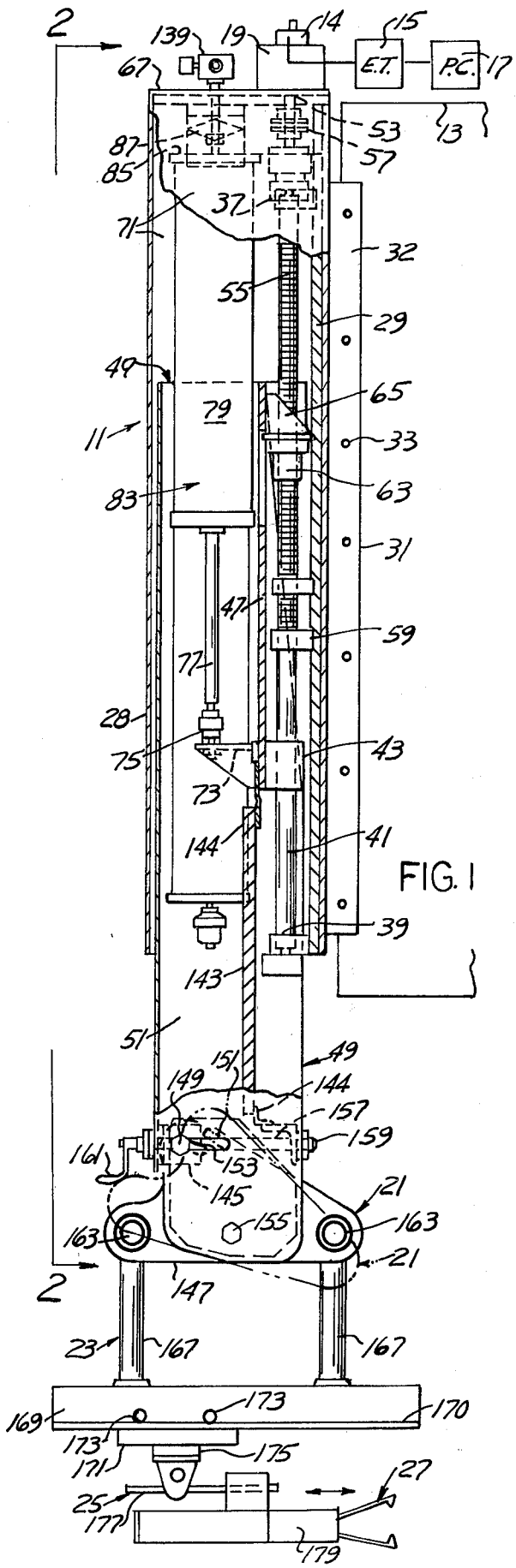
FIG. 2
FIG. 1

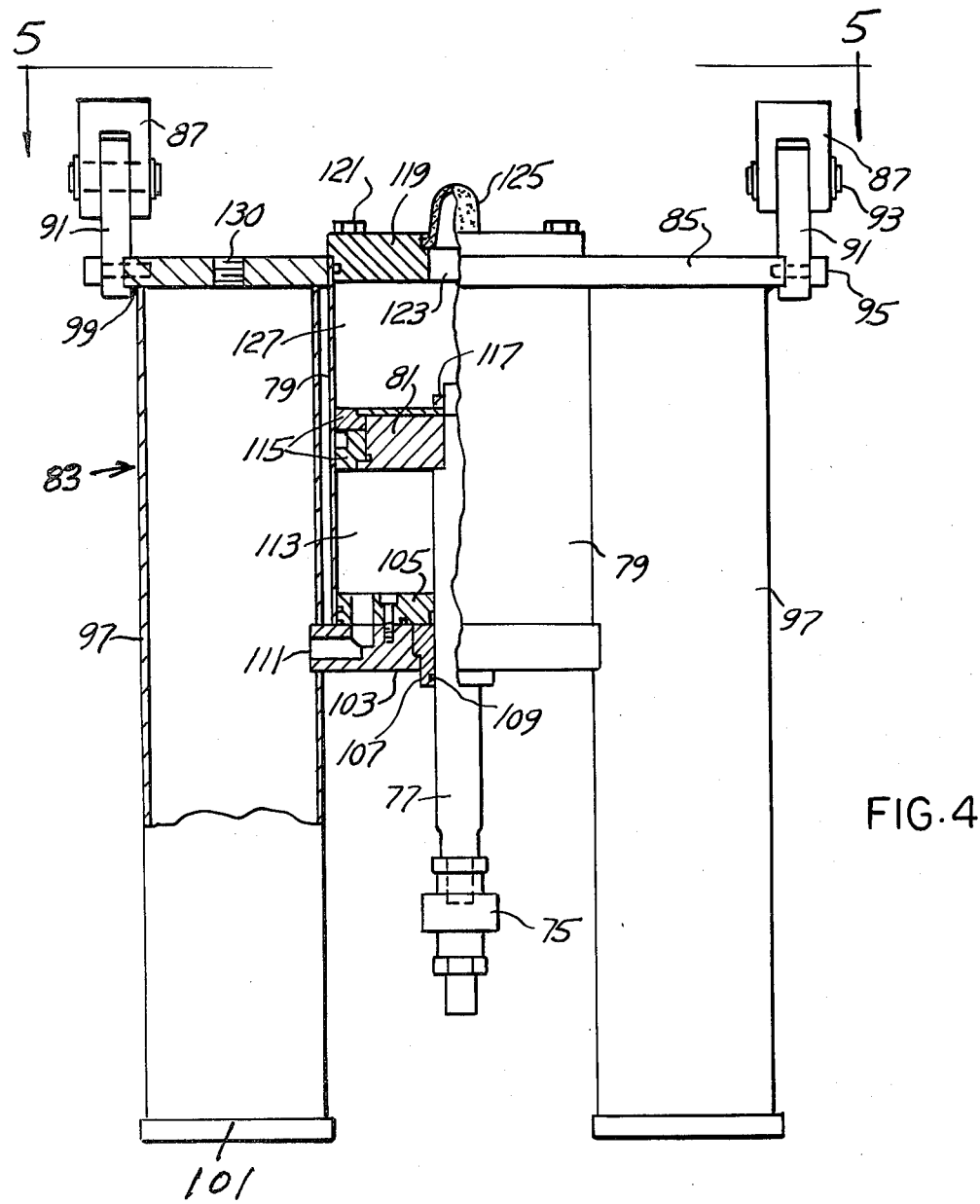
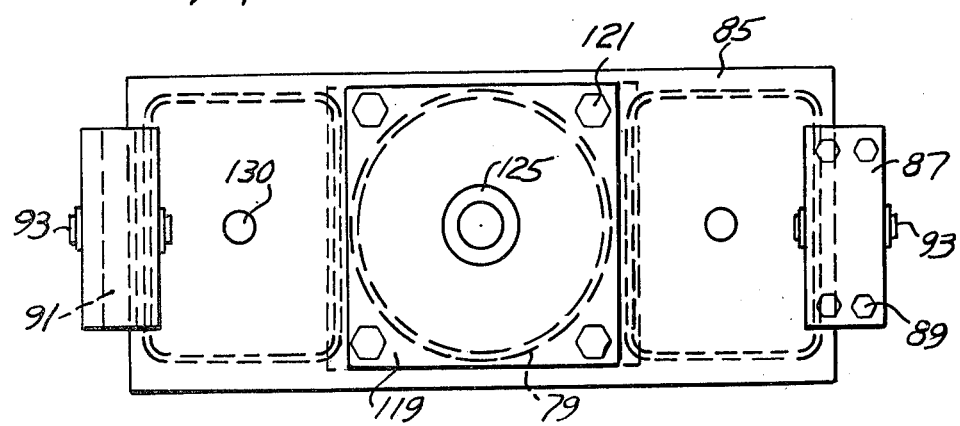
FIG.4
FIG.5

AUTOMATION LIFT UNIT

BACKGROUND OF THE INVENTION

Heretofore in the use of a press or a machine tool having a bed for forming a workpiece, there have been employed specifically actuated workpiece gripper tools which are adapted for timed reciprocal movements made generally in a horizontal plane and with respect to a workpiece for positioning such workpiece upon the bed, retracting, and after a pressing operation or other machine tool operation, the gripper is adapted to again feed horizontally and to successively grip the workpiece and retract rearwardly lifting the workpiece from the press bed. Normally, in such transverse reciprocal movements of the gripper tool there is a vertical component involved for conveniently elevating the workpiece from the press bed on retraction thereof and for thereafter positioning the retracted workpiece in a predetermined vertical plane.

THE PRIOR ART

Devices of this type are shown in one or more of the following U.S. Patents:

| | | |
|---|---|---|
| 3,665,771 | Dated May 30, 1972 | Stroke Multiplying Retractor Mechanism |
| 3,714,870 | Dated February 6, 1973 | Dual Grip Actuating Unit With Travel Cylinder Assembly |
| 3,734,303 | Dated May 22, 1973 | Travel Cylinder and Gripper Actuator With Triple Guide Rods |
| 3,742,774 | Dated July 3, 1973 | Adjustable Stroke Retractor Mechanism. |
| 3,866,485 | Dated February 18, 1975 | Angular Adjustment Mount For A Workpiece Extractor. |

The problem involved with devices of this type heretofore employed is to provide a positive automation type of control mechanism in conjunction with a workpiece extractor tool with a press or other machine tool wherein there may be a predetermined control regulating vertical adjustments of the workpiece gripper tool. There has been a need for a programmed cycle of reciprocal and interrupted vertical movements in conjunction with a workpiece gripper tool wherein there are controlled and/or programmable means for regulating the substantially horizontal or angular reciprocal movements of the gripper tool. Such horizontal movements are for delivering a workpiece onto the bed of a press, retracting the gripper tool before the machining operation and thereafter advancing the gripper tool for gripping and retracting the finished workpiece and for elevating the workpiece in a predetermined cycle.

SUMMARY OF THE INVENTION

An important feature of the present invention is to provide DC motor operated ball screw having an encoder feedback to a central programmable control or a computer numerical control incorporated into a vertical lift unit and incorporating an electronic encoder upon the motor for controlling the direction and number of rotations of its drive shaft for effecting a programmed repetitive cycle of predetermined vertical feed movements of the carriage which mounts in an adjustable support cradle for a workpiece gripper tool.

A further feature is to provide in conjunction with the electronic encoder, a preset programmer control (PC) or a Computer Numerical Control (CNC) and an electronic encoder feedback circuit interconnecting the encoder and PC or CNC.

A further feature is to provide an automation lift unit which is designed to accelerate at relatively high speeds and to stop in numerous positions controlled by a preset program in the controller.

A further feature incorporates the present lift unit as the vertical axis of a robotic system and for carrying upon its adjustable support cradle a hanger mount assembly to which is suspended another programmed substantially horizontal or angular feed device programmed for horizontal, angular or compound motion pursuant to a program that is related to certain movements of the vertical axis as well as a horizontal axis.

The present invention is further directed to a method of accurately controlling vertical motion coupling therewith horizontal motion and incorporating the two units for functioning together pursuant to programmed control.

A further feature is to provide within the automation lift unit, a housing having a back plate mounting upright guide rods and journalling an upright feed screw driven by a DC motor and with a carriage guidably mounted upon the rods and threadedly engaging the screw.

There is employed a programmable DC motor on the housing which drive shaft is coupled with the feed screw. An adjustable support cradle depends from the carriage and is adapted to mount a workpiece gripper tool adapted for programmed horizontal, angular or compound movements relative to the press bed. An electronic encoder is connected to the motor for controlling the direction and number of rotations of its drive shaft for affecting a programmed repetitive cycle of predetermined feed movements of the carriage and the workpiece gripper tool connected thereto.

A further feature includes the use of a preset programmable control (PC) together with an electronic encoder feedback circuit interconnecting the encoder and PC.

A further feature incorporates in conjunction with the lift unit a cylinder and surge tank weight compensation assembly which includes a cylinder assembly which may be pressurized including a reciprocal piston and piston rod connected to the reciprocal carriage for floating the loaded adjustable cradle support thereon wherein the pressure developed within the cylinder assembly is adapted to overcome any weight of the entire assembly including the carriage and the loaded adjustable cradle support in order that the DC motor will actuate the telescoping assembly incorporated into the lift unit with a minimum of expended energy.

These and other objects will be seen from the following specification and claims in conjunction with the appended drawings.

THE DRAWINGS

FIG. 1 is a fragmentary side elevational view of the present automation lift unit as applied to press fragmentarily shown.

FIG. 2 is an elevational view taken in the direction of arrows 2—2 of FIG. 1.

FIG. 4 is a fragmentary partly sectioned elevational view of the cylinder and surge tank weight compensation assembly shown in FIG. 1.

FIG. 5 is a plan view thereof.

Figure 3:
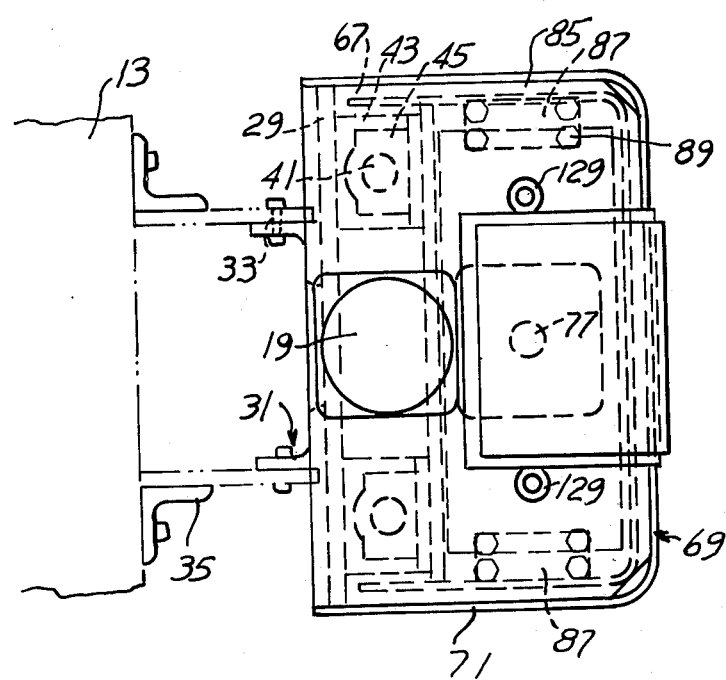
FIG. 3 is a plan view of the lift unit.

It will be understood that the above drawings illustrate merely one operative embodiment of the invention, and that other embodiments are contemplated within the scope of the claims hereafter set forth.

DETAILED DESCRIPTION OF ONE EMBODIMENT OF THE INVENTION

Referring to the drawings, the present automation electronic lift unit, sometimes referred to as lift unit is designated at 11 in FIGS. 1 and 2 and is adapted for mounting upon the press 13 or machine tool fragmentarily shown in FIG. 1.

DC motor 19 sometimes referred to as a servo motor, FIG. 1 has an electronic encoder 14 adapted for controlling the direction and number of rotations of its drive shaft 53 for effecting a programmed repetitive cycle of predetermined feed movements of the carriage 47 which mounts an adjustable support cradle 21 and depending therefrom a hanger mount assembly 23.

As schematically shown in FIG. 1, there is an electronic program control (PC), or as equivalent thereto a computer numerical control (CNC) at 17. An encoder feedback circuit shown schematically by the box 15 in FIG. 1 interconnects encoder 14 and the computer numerical control or PC 17.

Incorporated into the automation vertical lift unit and suspended from the hanger mount assembly 23 upon the adjustable support cradle 21 is a horizontal feed control generally indicated at 25 which mounts a workpiece engaging gripper tool 27.

Upright elongated housing 28, FIG. 1 includes an elongated back plate 29. An upright elongated hanger 31, FIG. 3 includes a pair of upright spaced opposed hanger flanges having a series of longitudinally spaced mount holes 33, FIG. 1 adapted to receive suitable fasteners for securing the housing and the connected backplate 29 through the bracket 35 in an upright position upon the press 13 fragmentarily shown in FIGS. 1 and 3.

Spaced pairs of shaft mounts 37 are secured upon one side of the back plate 29 and are secured to a pair of upright hardened guide rods 41 of circular cross section arranged upon the interior of housing 28. A pair of centrally arranged apertured rod stiffeners 39 are secured to said back plate and receive intermediate portions of rods 41.

A vertically adjustable telescoping carriage includes upright carriage plate 47 guidably mounted upon said rods for reciprocal movements thereon. For this purpose, spaced pairs of pillow blocks 43 supporting bushings 45 are secured to and project from carriage plate 47 and are slidably mounted upon the respective rods 41.

Telescope mount assembly 49 includes a pair of spaced side plates 51 which extend at right angles to carriage plate 47 and are suitably secured thereto. Said side plates extend below housing 28 and suspend at their lower ends the adjustable cradle support 21.

The upright elongated feed screw or ball screw 55 is mounted and journalled upon housing backplate 29 and at its upper end is coupled at 57 to the drive shaft 53 of motor 19, FIG. 1. A pair of vertically adjustable bearing mounts 59, FIG. 2 including bearing housings 61 with annular contact bearings, are secured to backplate 29 forwardly thereof and support and journal the upright feed screw 55 at its opposite ends, FIG. 2.

Threaded ball nut 63 mounted upon ball mount bracket 65 is secured to carriage plate 47 and is in threaded engagement with ball screw 55. Housing 28, FIGS. 1 and 2 has a top plate 67 which overlies and is secured to the parallel spaced upright side plates 71 secured to housing backplate 29. Said top plate 67 and side walls 71 form a part of the cover shell 69 forming a part of housing 28. DC motor 19 is mounted and secured upon top plate 67 and its drive shaft 53 projects through said top plate in alignment with feed screw 55 to which it is coupled thereto at 57.

Arranged forwardly upon reciprocal carriage plate 47 within housing 28 is a bracket 73 which is secured to the reciprocal piston rod 77 by the rod aligner 75. Said piston rod forms a part of a cylinder assembly and surge tank weight compensation assembly 83, FIGS. 1, 4 and 5.

The cylinder assembly includes upright air cylinder 79 having a reciprocal piston 81 therein, FIG. 4 and the connected piston rod 77 which projects through rod end assembly 103 of said cylinder and at its lower end mounts the rod aligner 75. The cylinder and surge tank weight compensation assembly further includes support plate 85, FIGS. 1, 2, 4 and 5 which is spaced below housing top plate 67 and is suspended therefrom.

For this purpose a pair of brackets 87 are arranged at opposite ends of the top plate 67 and are secured thereto by a plurality of fasteners 89, FIGS. 3 and 5. Upright supports 91 at their upper ends extend into the brackets 87 and are pivotally mounted thereon by the pivot pins 93. The lower ends of supports 91 engage end portions of the support plate 85 and are secured thereto by fasteners 95, FIG. 4.

The surge tank assembly includes the elongated surge tank tube 97 of cylindrical form at its upper end secured to support plate 85 as by the welds 99, and includes a bottom plate 101. Rod end assembly 103 includes the rod seal assembly 105 secured to rod end assembly 103 and mounts the rod bushing 107 and rod wiper 109. Passage 111 formed within rod end assembly 103 communicates with the interior of surge tank 97 and with the lift chamber 113 within cylinder 79 defined by piston 81.

In the illustrative embodiment there are provided a pair of surge tank tubes 97 which are secured at their upper ends to the support plate 85 and are arranged upon opposite sides of air cylinder 79. A corresponding additional passage 111 in the rod end assembly 103 interconnects the interior of the other surge tank 97 with the pressure lift chamber 113.

Piston 81 includes wear plates 115 with corresponding O-rings or seals secured to the piston rod as by the assembly nut 117. Cylinder 79 has a blind end 119 which projects up through a corresponding aperture within support plate 85 and is suitably secured to by fasteners 121, FIGS. 4 and 5. Blind end 119 has a central bore 123 in communication with blind end chamber 127 over which is mounted and secured the porous hemispherical breather dome 125 establishing communication of atmosphere with chamber 127.

Pressurized fluid such as compressed air is delivered to the surge tanks 97 by a pair of upright tubes 129 threaded into the upper ends of the cylinders 97 as at 130, FIG. 5. The upper ends of the tubes are connected by suitable fittings 133 to the manifold pipe 131. Pressure release valve 135 is mounted adjacent one end of manifold 131 and may be manually operated as shown or could be pilot or electrically operated remotely.

Means therefore are provided by which the surge tanks 97 may be depressurized as desired, such as for servicing. A conventional air silencer 137 is applied to one end of the manifold 131 reducing the noise of escaping air when the pressure release valve is opened. The other end of the manifold 131 is connected to a suitable source of air pressure 141 with a pressure regulator 139 interposed as shown in FIG. 2.

The adjustable support cradle 21, FIG. 1 is suspended from the lower ends of the side plates 51 of the reciprocal carriage including the transverse upright carriage plate extension 143 suitably secured thereto as by brackets 144. The adjustable support cradle 21 includes transverse adjusting bar 145 which extends between side plates 51 and is adjustably mounted thereon by the pair of opposed screws 149 which are movably positioned within the opposed pair of elongated side plate slots 151, FIG. 1.

The adjustable support cradle includes a pair of upright parallel spaced cradle end support plates 147 which are arranged inwardly of the lower ends of the side plates 51. Upper portions of the cradle end support plates 147 bear against the ends of the adjusting bar 145 and are further secured thereto by the same fasteners 149 which extend through the angular slots 153 formed through each of the end support plates 147. These slots 153 are arranged at an acute angle with respect to the adjusting bar support slots 151 on side plates 51.

Screws 155 extend through side plates 51, FIG. 1 and through corresponding central portions of the respective cradle end support plates 147 providing a pivotal mounting for the adjustable support cradle 21.

Adjusting screw 157 is journalled at its opposite ends at 159 upon the carriage and is centrally arranged with respect to side plates 51 and parallel thereto. Said screw is adjustably threaded transversely through adjusting bar 145 and mounts a crank handle 161, FIG. 2. A pair of transverse hanger mount bars 163, FIGS. 1 and 2 are interposed between end portions of the cradle end support plates 147 and suitably secured thereto as by the welds 165.

With the mounting loosened as at 159 and on manual rotation of the crank 161, the transverse adjusting bar 145 may be advanced or retracted with respect to the side plates 151 and relative to the elongated side plate slots 151. In order to accomodate tilting of the support cradle and support plates 147, said plates include the angular slots 153 so that the side plates may take the dash line adjusted position shown in FIG. 1.

Suspended from and mounted upon the hanger mount bars 163 of the adjustable support cradle 21 is the hanger mount assembly generally indicated at 23 and including a pair of shuttle hanger brackets 167, FIG. 1 which at their upper ends are secured to the respective hanger mount bars 163.

Schematically shown is a linear shuttle assembly unit 169 which is secured to and suspended from the shuttle hanger brackets 167. The shuttle assembly or linear shuttle unit is generally horizontally disposed and includes elongated trackways 170 receiving the roller supports 173 for the carriage 171.

Generally under the functioning and operation of the shuttle assembly 169, the detail of which is omitted therein, the carriage 171 is adapted for programmed and timed reciprocal movements in a horizontal plane or at an inclined plane relative to the vertical axis of the carriage assembly 47 by adjustment of the support cradle 21.

Depending from the carriage 171 schematically shown is the bracket 175 which mounts the elongated support rod 177 forming a part of the automation extractor gripper head assembly 179 which mounts the gripper tool 27. The function and operation of the automation extractor gripper head assembly 179 is set forth in one or more of the foregoing listed prior art patents of the applicant and their detail of construction is not repeated herein.

Suffice it to say that the automation extractor gripper head assembly 179 includes suitably cylinder assemblies and reciprocal piston and piston rods pneumatically controlled in such a fashion as to provide a programmed timed reciprocal movement of the carriage 171 generally in a direction at right angles to the vertical reciprocal feed movements of the lift unit carriage or telescope mount assembly generally indicated at 49, FIG. 1.

OPERATION

The present electric lift unit or automation lift unit in the illustrative embodiment has a 30 inch stroke and has a DC motor 19 driving elongated ball screw 55. The electronic encoder 14 upon the DC motor is connected by the encoder feed back circuit 15, FIG. 1 to the programmable control or PC 17. It is contemplated as equivalent that instead of the programmable control, there would be employed a CNC (Computer Numerical Control).

The present unit is designed to accelerate the reciprocal carriage assembly 49 and the connected adjustable support cradle 21 at relatively high speeds and under the control of the particular preselected program in various positions.

The present lift unit is the vertical axis of a robotic system and carries on its adustable support cradle 21, FIG. 1 the hanger mount assembly 167 to which is secured and adjustably suspended the linear shuttle unit or shuttle assembly 169. This device also may be programmed for horizontal, angular or compound motion as preset in a program. It may be interrelated to certain movements of the various axis as well as the horizontal axes. Generally speaking, the present lift unit is a heavy duty accurate device and method for controlling vertical motion and coupled therewith a horizontal motion by marrying the two units together.

Under the program control, the output shaft 53 of motor 19 has its direction of rotation and the number of rotations of its drive shaft so controlled as to provide a programmed repetitive cycle of predetermined feed movements of the carriage 49 and the adjustable cradle support depending therefrom.

The carriage plate 47 is guidably and slidably mounted upon the rods 41 within the housing of the lift unit and the vertical movements thereof are controlled by the ball screw 55 engaging the ball nut 63 secured to the reciprocal carriage 47, also referred to as a telescoping carriage assembly.

The lower end of the reciprocal carriage including the side plates 51 mounts the angularly adjustable cradle support 21 wherein by turning the hand crank 161 the angle of inclination of the support cradle 21 may be adjusted such as to the dash line position shown in FIG. 1. This means that the hanger mount assembly and the linear feed unit 169 may be angularly adjusted so that the plane passing through the supports 163 may be inclined as desired in its reciprocal movements relative to the vertical lift unit.

With respect to the cylinder and surge tank weight compensation assembly, the corresponding surge tanks 97 are machined to receive portions of the rod end 103 for establishing communication through the passages 111 into the lift chambers 113. Therefore pneumatic pressure within the tanks 97 is adapted to flow or be communicated from both of the tanks through the passages 111 and into the lift chamber 113.

The hemispherical porous dome 125 upon the rod end 119 of the cylinder 79 allows atmospheric pressure to be maintained in the blind end chamber 127. Therefore, pnuematic pressure is created only within the lift chamber 113 creating a lifting force on the piston rod 77 which is connected as at 75 to the reciprocal carriage plate 47 of the telescoping assembly.

Any pressure within the lift chamber 113 is adapted to overcome the weight and load of the carriage assembly with the tools mounted thereon hanging vertically as shown in FIG. 1. The pneumatic pressure within chamber 113 can be increased as needed by delivering of additional pressurized air through the pipes 129 from manifold 131. Furthermore, the pressure regulator 139 may be preset for predetermining the amount of pressure to be established within the surge tanks 97.

The manually controlled or pilot or electrically operated valve 135 is a release valve to release any pressure in the cylinder lift chamber 113 and the tanks 97 in the case of a requirement for servicing the unit.

The air supply to the surge tanks being through the pressure regulator 139 may be adjusted to float the telescoping mount assembly and any weight hanging therein. This is necessary so that the motor 19 actuates the telescoping assembly with a minimum of expended energy.

An exact setting can be accomplished with an ammeter across the field of the DC motor and then setting the pressure regulator so that the average will read the same on both the up cycle and the down cycle. If greater sophistication is required, the load could be controlled with a servo motor control of the pressure regulator feed from the PC or Computer Control System generally designated at 15-17, FIG. 1.

Having described my invention, reference should now be had to the following claims:

I claim:

1. A lift unit mountable upon a press or machine tool comprising an upright housing including a backplate;
   a pair of upright parallel spaced guide rods within said housing mounted upon and spaced forwardly of said backplate;
   an upright feed screw mounted upon and spaced forwardly of said backplate;
   a carriage including an upright carriage plate guidably mounted upon said rods for reciprocal movements thereon threadably engaging said feed screw;
   a top plate on said housing;
   a DC motor mounted upon said top plate having a drive shaft aligned with and coupled to said feed screw;
   said carriage extending below said housing;
   an adjustable support cradle mounted upon and depending from said carriage adapted to mount a workpiece gripper tool;
   and an electronic encoder mounted upon said motor for controlling the direction and number of rotations of its drive shaft for effecting a programmed repetitive cycle of predetermined feed movements of said carriage.

2. In the lift unit of claim 1, a hanger means upon and projecting from said back plate secured to said press;
   said hanger means including an elongated hanger plate extending along said housing having a series of longitudinally spaced fastener apertures therein.

3. In the lift unit of claim 1, a shuttle hanger bracket mounted upon and depending from said cradle support;
   a shuttle assembly secured to said shuttle hanger bracket and including a trackway extending substantially transverse of said carriage;
   a carriage reciprocally mounted upon said trackway;
   and an automatic gripperhead extractor suspended from said carriage and mounting said workpiece gripper tool.

4. In the lift unit of claim 1, a cylinder and surge tank weight compensation assembly mounted and suspended from said top plate including a cylinder assembly including an upright cylinder at its blind end secured to said top plate, a reciprocal piston and a piston rod depending from the rod end of said cylinder and at its lower end secured to said carriage for counterbalancing the load thereon;
   said piston defining a lift chamber adjacent said rod end and a blind end chamber communicating with atmosphere;
   said surge tank assembly including an elongated pressurized surge tank depending from said top plate and connected to a source of air pressure;
   there being a passage in the cylinder rod end interconnecting said surge tank with said lift chamber.

5. A lift unit mountable upon a press or machine tool comprising an upright housing including a backplate;
   a pair of upright parallel spaced guide rods within said housing mounted upon and spaced forwardly of said backplate;
   an upright feed screw mounted upon and spaced forwardly of said backplate;
   a carriage including an upright carriage plate guidably mounted upon said rods for reciprocal movements thereon threadably engaging said feed screw;
   a top plate on said housing;
   a DC motor mounted upon said top plate having a drive shaft aligned with and coupled to said feed screw;
   said carriage extending below said housing;
   an adjustable support cradle mounted upon and depending from said carriage adapted to mount a workpiece gripper tool;
   an electronic encoder mounted upon said motor for controlling the direction and number of rotations of its drive shaft for effecting a programmed repetitive cycle of predetermined feed movements of said carriage;
   said carriage being of U-shape in cross-section including a pair of spaced side plates;
   said adjustable cradle support being mounted upon and depending from said side plates;
   said cradle including a pair of spaced upright cradle end support plates pivotally mounted centrally at their lower ends upon said side plates;
   a pair of parallel spaced mount bars interposed between end portions of said plates and secured thereto;
   and a manually adjustable hanger bar interposed between and connected to the upper ends of said cradle end support plates and adjustably mounted upon said carriage side plates for presetting the angle of a plane passing through said mount bars.

6. In the lift unit of claim 5, the manual adjustment of said hanger bar including an adjusting screw having a handle journalled upon said carriage parallel to its side plates and threaded through said hanger bar.

7. A lift unit mountable upon a press or machine tool comprising an upright housing including a backplate;
- a pair of upright parallel spaced guide rods within said housing mounted upon and spaced forwardly of said backplate;
- an upright feed screw mounted upon and spaced forwardly of said backplate;
- a carriage including an upright carriage plate guidably mounted upon said rods for reciprocal movements thereon threadably engaging said feed screw;
- a top plate on said housing;
- a DC motor mounted upon said top plate having a drive shaft aligned with and coupled to said feed screw;
- said carriage extending below said housing;
- an adjustable support cradle mounted upon and depending from said carriage adapted to mount a workpiece gripper tool;
- an electronic encoder mounted upon said motor for controlling the direction and number of rotations of its drive shaft for effecting a programmed repetitive cycle of predetermined feed movements of said carriage;
- a cylinder and surge tank weight compensation assembly mounted and suspended from said top plate including a cylinder assembly including an upright cylinder at its blind end secured to said top plate, a reciprocal piston and a piston rod depending from the rod end of said cylinder and at its lower end secured to said carriage for counterbalancing the load thereon;
- said piston defining a lift chamber adjacent said rod end and a blind end chamber communicating with atmosphere;
- said surge tank assembly including an elongated pressurized surge tank depending from said top plate and connected to a source of air pressure;
- there being a passage in the cylinder rod end interconnecting said surge tank with said lift chamber.

8. In the lift unit of claim 7, the suspension of said support plate including brackets secured to and depending from opposite ends of said housing top plate;
- and upright supports pivotally mounted upon said brackets and at their lower ends secured respectively to opposite ends of said support plate.

9. A lift unit mountable upon a press or machine tool comprising an upright housing including a backplate;
- a pair of upright parallel spaced guide rods within said housing mounted upon and spaced forwardly of said backplate;
- an upright feed screw mounted upon and spaced forwardly of said backplate;
- a carriage including an upright carriage plate guidably mounted upon said rods for reciprocal movements thereon threadably engaging said feed screw;
- a top plate on said housing;
- a DC motor mounted upon said top plate having a drive shaft aligned with and coupled to said feed screw;
- said carriage extending below said housing;
- an adjustable support cradle mounted upon and depending from said carriage adapted to mount a workpiece gripper tool;
- an electronic encoder mounted upon said motor for controlling the direction and number of rotations of its drive shaft for effecting a programmed repetitive cycle of predetermined feed movements of said carriage;
- said carriage being of U-shape in cross-section including a pair of spaced side plates;
- said adjustable cradle support being mounted upon and depending from said side plates;
- said cradle including a pair of spaced upright cradle end support plates pivotally mounted centrally at their lower ends upon said side plates;
- a pair of parallel spaced mount bars interposed between end portions of said plates and secured thereto;
- and a manually adjustable hanger bar interposed between and connected to the upper ends of said cradle end support plates and adjustably mounted upon said carriage side plates for presetting the angle of a plane passing through said mount bars;
- a shuttle hanger bracket mounted upon and depending from said cradle support;
- a shuttle assembly secured to said shuttle hanger and including a trackway extending substantially transverse of said carriage;
- a carriage reciprocally mounted upon said trackway;
- and an automatic gripper head extractor suspended from said carriage and mounting said workpiece gripper tool.

10. In the lift unit of claim 9, the manual adjustment of said hanger bar presetting the angular path of reciprocal movement of said carriage and workpiece gripper tool for delivering and successively withdrawing a workpiece from said press.

* * * * *